(12) United States Patent
Brusilovsky

(10) Patent No.: US 8,439,526 B2
(45) Date of Patent: May 14, 2013

(54) VARIABLE-COLOR LIGHTING SYSTEM

(76) Inventor: Zinovi Brusilovsky, Kiryat-Gat (IL)

(*) Notice: Subject to any disclaimer, the term of this patent is extended or adjusted under 35 U.S.C. 154(b) by 606 days.

(21) Appl. No.: 12/636,433

(22) Filed: Dec. 11, 2009

(65) Prior Publication Data

US 2011/0141725 A1    Jun. 16, 2011

(51) Int. Cl.
*F21V 8/00* (2006.01)
(52) U.S. Cl.
USPC .............................. 362/304; 362/231; 362/555
(58) Field of Classification Search ............ 362/551, 362/555, 304, 305, 231, 235, 236, 237, 241, 362/247, 346, 800
See application file for complete search history.

(56) References Cited

U.S. PATENT DOCUMENTS

| | | | | |
|---|---|---|---|---|
| 5,465,194 | A * | 11/1995 | Currie | 362/464 |
| 6,527,411 | B1 * | 3/2003 | Sayers | 362/245 |
| 6,733,166 | B2 * | 5/2004 | Hulse | 362/551 |
| 7,237,927 | B2 * | 7/2007 | Coushaine et al. | 362/554 |
| 7,443,591 | B1 * | 10/2008 | Cianciotto et al. | 359/618 |
| 7,850,334 | B2 * | 12/2010 | Holder et al. | 362/227 |
| 8,047,675 | B1 * | 11/2011 | Millikan | 362/241 |
| 2002/0102058 | A1 * | 8/2002 | Hulse | 385/45 |
| 2005/0281048 | A1 * | 12/2005 | Coushaine et al. | 362/555 |
| 2010/0066254 | A1 * | 3/2010 | Ott et al. | 315/129 |

* cited by examiner

*Primary Examiner* — Bao Q Truong
(74) *Attorney, Agent, or Firm* — Smith Risley Tempel Santos LLC; Gregory Scott Smith

(57) ABSTRACT

An illumination system consisting of a plurality of illumination sources, a common illumination flux transforming and colour mixing element, and a controller controlling the sequence of each of illumination sources operation, their power, and colour. The illumination flux transforming and colour mixing element operates to transform the power and colour of the illumination provided by light sources into a spot filling the illumination output surface and providing the desired illumination.

13 Claims, 18 Drawing Sheets

VARIABLE-COLOR LIGHTING SYSTEM

TECHNOLOGY FIELD

The present apparatus relates generally to lighting apparatuses and in particular to lighting apparatuses that support variation in the colour and brightness of light generated by the apparatus.

BACKGROUND

Almost all lighting apparatuses currently available on the market produce illumination of approximately the same colour, daylight (white colour) or warm daylight (slightly yellowish colour). When a different colour is required it occurs using filters and colour coatings.

Light-emitting diodes (LEDs) typically emit illumination or light of a single predetermined colour, although LEDs emitting a variety of colours exist. Colour music devices for example use a large number of LEDs emitting light of different colours to produce variable or constant colour illumination. However, the colours produced cannot be mixed to produce a colour continuum and in order to generate illumination of the desired power light emitted by a large number of LEDs has to be collected. The size of such a light sources is relatively large since the LEDs have to be distributed over the surface of an outlet opening of the illumination source.

Different types of reflectors or illumination concentrators including conical, spherical, and aspherical are used to collect and concentrate the light emitted by a plurality of LEDs onto the smaller area of the outlet opening. However, analyses show that such concentrators collect at maximum 5% of the light flux emitted by a plurality of LEDs or other light sources.

LEDs containing a number of emitters in one common package, each emitting light of different colour are know, they cannot, however, be operated simultaneously, nor do they allow colour mixing to produce a continuum of colours. They usually produce a low luminous flux. There are however no illumination apparatuses of relatively small size, capable of producing white light and varying colours and intensities of illumination flux, and concentrating the emitted flux on a relatively small surface or a line.

GLOSSARY

The terms "light" and "illumination" are used interchangeably within the current text and have the same meaning. The terms include electromagnetic radiation of different wavelengths such as visible light, infrared light, and others.

The terms "illumination outlet" and "illumination opening" as used in the present document designate an opening through the cross section or surface of which the apparatus or an illumination transforming and colour mixing element emit light.

The terms "white light" and "white illumination" as used in the current text have the same meaning and mean polychromatic illumination.

The terms "luminous flux" and "illumination flux" as used in the current text have the same meaning.

BRIEF SUMMARY

Disclosed is a lighting apparatus that includes one or more illumination sources emitting a luminous flux of the same or different colour and a luminous flux transforming and colour mixing element enabling reproduction of almost any colour mix and intensity. Some embodiments of the apparatus may include a light guide delivering the luminous flux to an illumination output surface, which may be the output opening of the apparatus or luminous flux transforming and colour mixing element. The illumination output surface may have a circular shape or a line extending on a desired dimension. The apparatus includes a control circuit operative to at least partially control the operation of each illumination source.

The luminous flux transforming and colour mixing element may be a double-cone structure including an outer cone with inside mirror surface and an inner cone with an outside mirror surface. In such a structure light sources arranged along the perimeter of the bases of the conical elements and located in the space between the cones emit luminous flux that leaves the luminous flux transforming and colour mixing element through its outlet opening. Such a conical element structure almost eliminates parasitic reflections reducing the luminous flux at the illumination output opening of the apparatus. The apparatus may provide almost any colour hue and a continuum of colour.

In some versions the luminous flux transforming and colour mixing element is an assembly of at least two conical elements. In other embodiments the luminous flux transforming and colour mixing element is two or more coaxial cylinders with light sources located in the space between the cylinders.

In some versions luminous flux of different colours may be mixed in a light guide coupled to the luminous flux transforming and colour mixing element. The light guide can be adapted to guide the luminous flux into a desired location and further contribute to generation of almost any hue. The light sources, e.g., LEDs, could be arranged in a row along and parallel to the light guide axis or inclined to it such that the light beams should be directed to the same side.

DETAILED DESCRIPTION OF EXEMPLARY EMBODIMENTS

Figure 1:
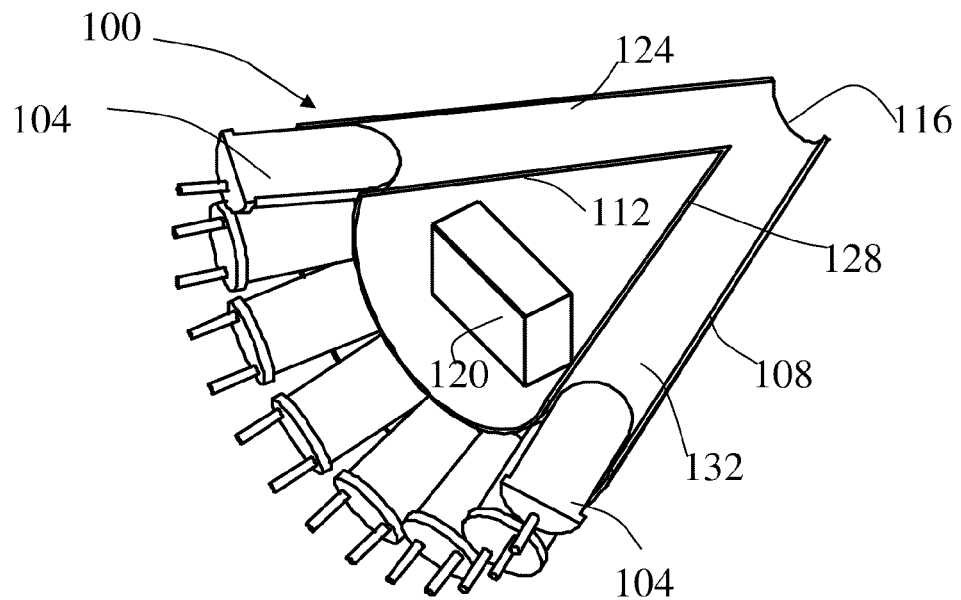
FIG. 1 is a schematic illustration of the first exemplary embodiment of the present lighting apparatus.

Reference is made to FIG. 1, which is a schematic illustration of the first exemplary embodiment of the present lighting apparatus. Apparatus 100 includes a plurality of illumination sources 104 operative to illuminate at least one surface of a common to all illumination sources 104 luminous flux transforming and colour mixing element, which is an assembly of at least two coaxial rotational symmetry shapes implemented as a double-cone structure consisting of an outer cone 108 and an inner cone 112, and output opening or surface 116. Illumination sources 104 are located between the outer cone 108 and an inner cone 112. A control circuit 120 governing operation of the illumination sources 104 may be located inside the apparatus 100, for example in the inner space of the cone reflector 112 or it could be external to the apparatus.

The outer cone 108 of the luminous flux transforming element has on its inner surface 124 a light reflecting or mirror type coating and the inner cone 112 has a light reflecting or mirror coating on its outside surface 128. The illumination sources 104, which in this particular embodiment are incandescent lamps or LEDs, may emit light of different wavelength or colours and the sources are typically located in the inter-cone space 132 at the base of the cones 108 and 112. The luminous flux transforming and colour mixing element operates to produce multiple reflections (no back reflections are present) and mixes almost all of the light emitted by the illumination sources 104 in the direction of the output opening or surface 116. Because of the multiple reflections, the luminous flux transforming and colour mixing element transforms the luminous flux provided by the illumination sources into a homogenous spot filling-in the illumination output surface 116 and emitting a light beam with uniform light distribution in the beam cross section.

Control circuit 120 operates to control the operation of light sources 104 that may function in a continuous or pulse operation mode or in a combination of both pulse and continuous operation modes. The control circuit 120 may operate to control operation sequence and the intensity of the light sources 104.

Figure 2:
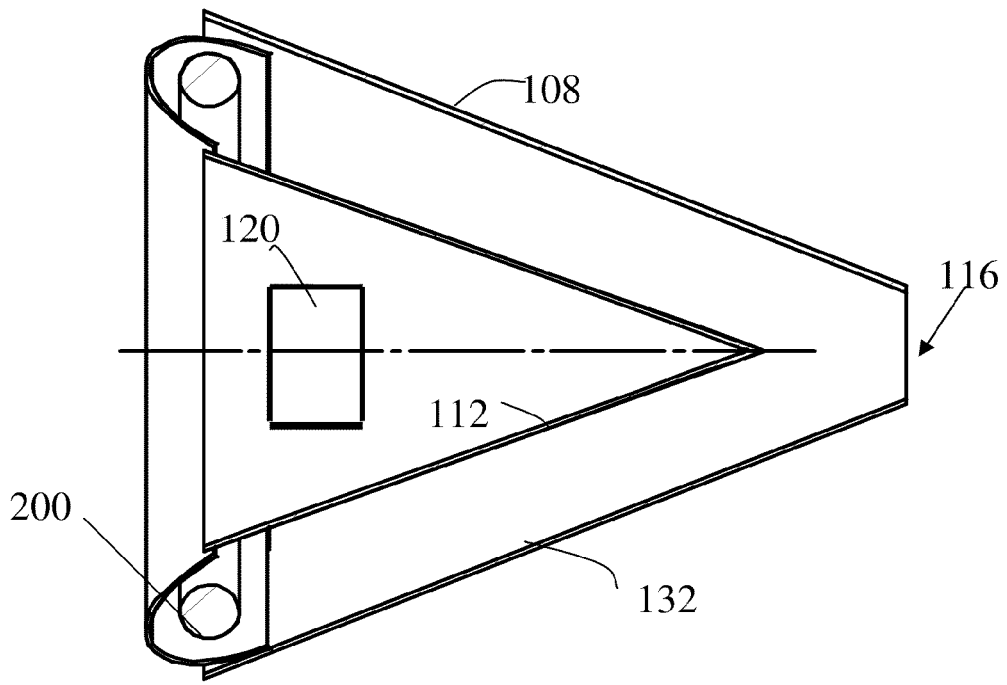
FIG. 2 is a schematic illustration of a variation of the first exemplary embodiment of the present lighting apparatus with a circular light source.

FIG. 2 is a schematic illustration of a variation of the first exemplary embodiment of the present lighting apparatus with a circular light source. Source 200 is a circular or ring-shaped luminescent lamp. The double-cone luminous flux transforming and colour mixing element collects all of the luminous flux emitted by the lamp 200 and concentrates it into a small illumination output opening or surface 116 providing a higher flux per square centimeter of the opening surface. This allows concentration of the illumination flux emitted by the lamp 200 into a smaller surface of opening 116. (Generally, the ratio of fluxes would be proportional to the ration of the surfaces of the lamp and the opening surface.)

Figure 3:
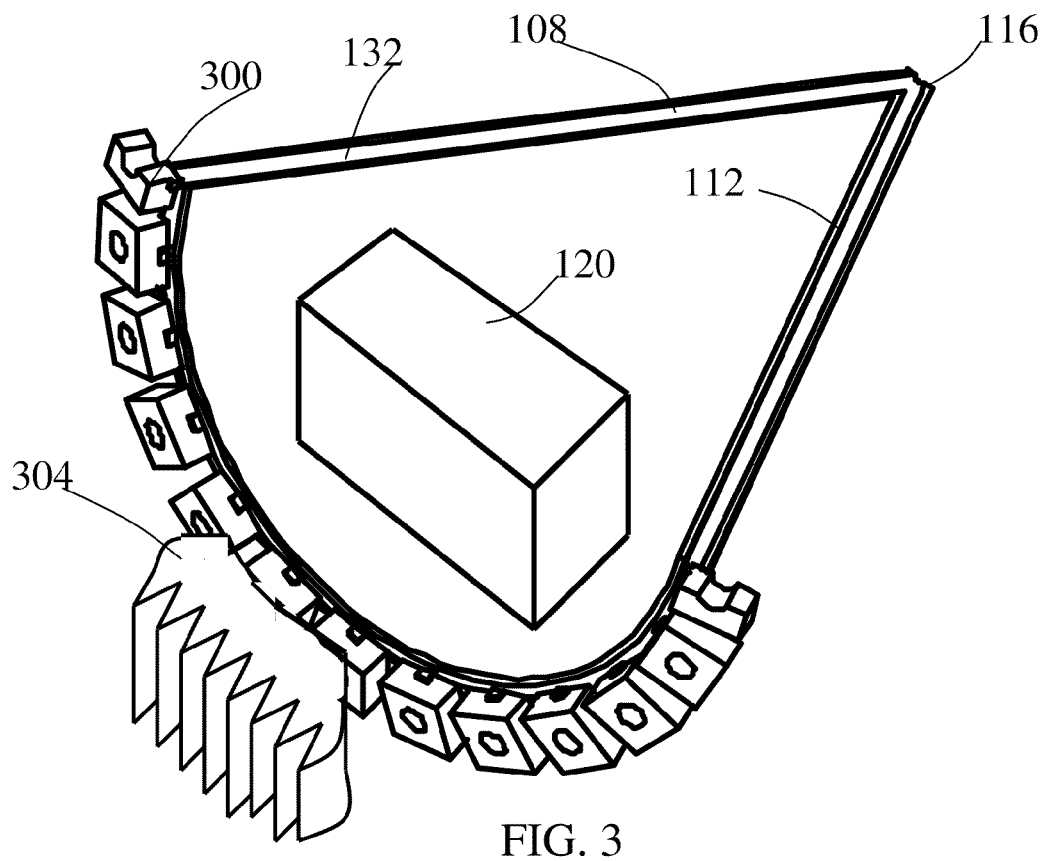
FIG. 3 is a schematic illustration of an additional variation of the first exemplary embodiment of the present lighting apparatus with illumination sources like LEDs and/or laser diodes.

FIG. 3 is a schematic illustration of an additional variation of the first exemplary embodiment of the present lighting apparatus with such illumination sources as LEDs and/or laser diodes. It is known that in the course of operation light sources such as lamps, LEDs, and laser diodes generate heat that adversely affects their operation. One of the advantages of the current embodiment is the location of the light sources 300 at the base and along the perimeter of cones 108 and 112. This location allows a heat sink 304 external to the luminous flux transforming element to be attached to the apparatus, enabling easy dissipation of heat. The heat sink 304 may be common to all light sources or an individual heat sink attached to each source 300.

Figure 4:
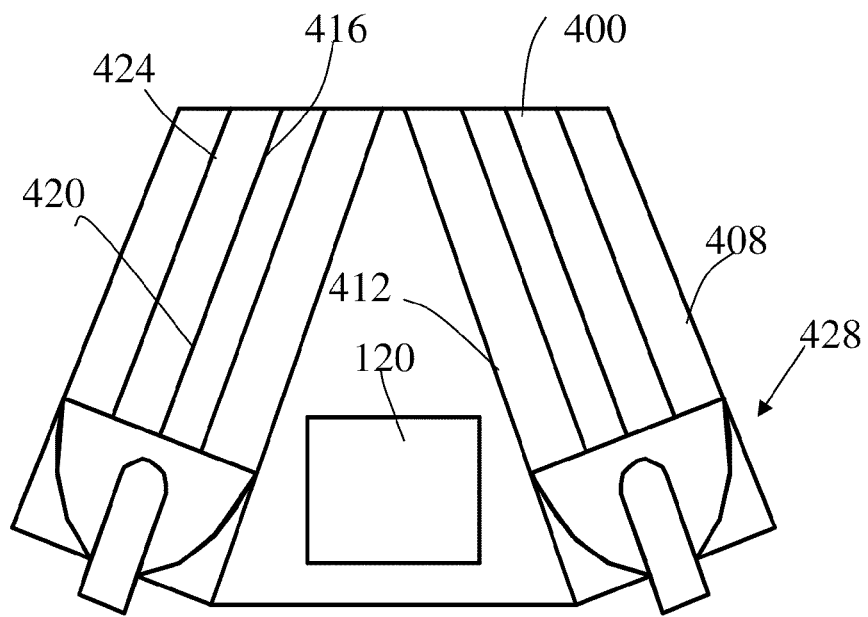
FIG. 4 is a schematic illustration of the second exemplary embodiment of the present lighting apparatus.

FIG. 4 is a schematic illustration of the second exemplary embodiment of the present lighting apparatus. The assembly of coaxial rotational symmetry shapes is implemented forming the flux transforming and colour mixing elements or concentrators may be multiple-cone structures. The advantage of such structures is in more effective colour mixing and in concentration of a greater light flux at the outlet opening. A five-cone concentrator is shown in FIG. 4. The operation of cones 408 and 412 and their structure is similar to cones 108 and 112 (FIG. 1). The most outer cone 408 has a reflective coating on the inner surface of the cone and the most inner cone 412 has a reflective coating on its outer surface. Interim cones 416, 420, and 424 have a reflective coating on both of their (inner and outer) surfaces. Light sources 428, shown as lamps emitting light flux into all inter-cone spaces. Other than lamps light, sources may be used with the five-cone concentrator.

Figure 5:
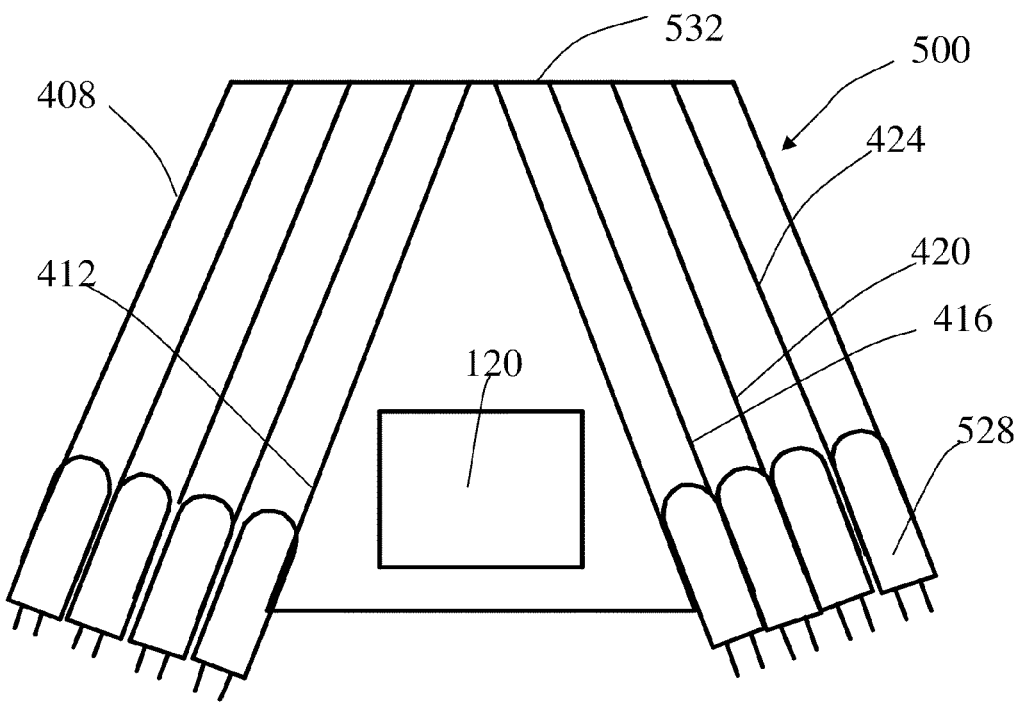
FIG. 5 is a schematic illustration of the third exemplary embodiment of the present lighting apparatus.

FIG. 5 is a schematic illustration of the third exemplary embodiment of the present lighting apparatus. The luminous flux transforming element 500 is a five-cone concentrator similar to the one shown in FIG. 4. The illumination sources, shown as LEDs 528 are located between the adjacent cones 408, 416, 420, 424, and 408. This further improves colour mixing and enables concentration of a greater light flux at the outlet opening 532. A heat sink (not shown) may be used to remove heat from the illumination sources 528.

Figure 6:
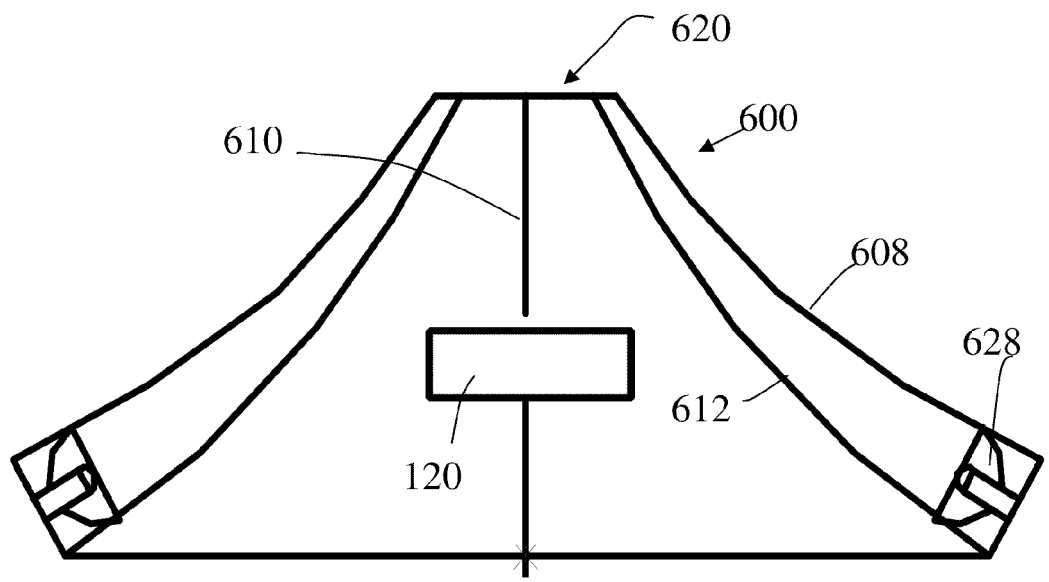
FIG. 6 is a schematic illustration of the fourth exemplary embodiment of the present lighting apparatus.

FIG. 6 is a schematic illustration of the fourth exemplary embodiment of the present lighting apparatus. In the previously illustrated embodiments the conical surfaces of the luminous flux transforming and mixing elements were coaxial and equidistantly spaced surfaces. Apparatus 600 includes a luminous flux transforming and mixing element or concentrator where the conical surfaces 608 and 612 converge toward the outlet opening 620. The operation of cones 608 and 612 is similar to the earlier described cones. The most outer cone 608 has a reflective coating on the inner surface of the cone and the most inner cone 612 has a reflective coating on its outer surface. Light sources 628, shown as incandescent lamps; emit light flux into all of the inter-cone spaces.

In addition to rectilinear cone generatrices, the generatrices may be curvilinear. Such curved surfaces 608 and 612 allow the luminous flux emitted by light sources 628 to enter the inter-cone space at angles with the cone axis 610 smaller than in the case of cones formed by rectilinear generatrics. The curvilinear conical surfaces may be coaxial and equidistantly spaced or they may converge, as shown in FIG. 6 toward the outlet opening 620.

Figure 7:
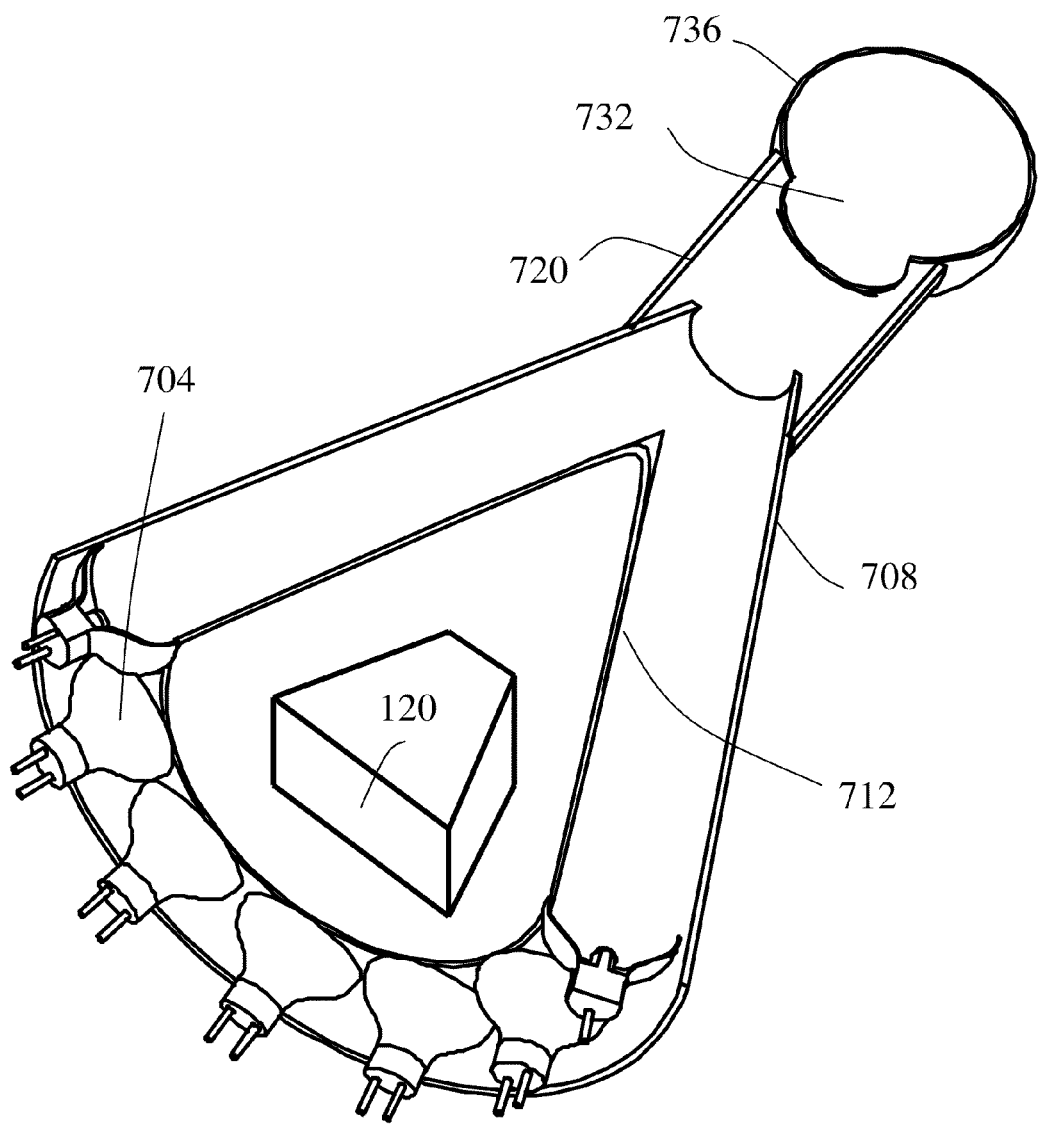
FIG. 7 is a schematic illustration of the fifth exemplary embodiment of the present lighting apparatus.

FIG. 7 is a schematic illustration of the fifth exemplary embodiment of the present lighting apparatus. The apparatus operates as follows. The light emitted by light sources 704 is concentrated and mixed by two coaxial cones 708 and 712 similar to cones 108 and 112 (FIG. 1) and directed into an additional colour mixing light guide 720 where the illumination emitted by different light sources is further mixed into almost one colour hue. After it is mixed into one colour in the light guide 720 illumination fills an outlet opening 732 that may be just an opening or may be terminated by a transparent light radiator 736. The size of radiator 736 may be made larger than the surface of the single light source 704, equal to the surface of a single light source 804, and smaller than the surface of a single light source 704. Accordingly the light radiator 736 size may correspond to that of an LED or a halogen lamp, depending on the type of the light source used.

Figure 8:
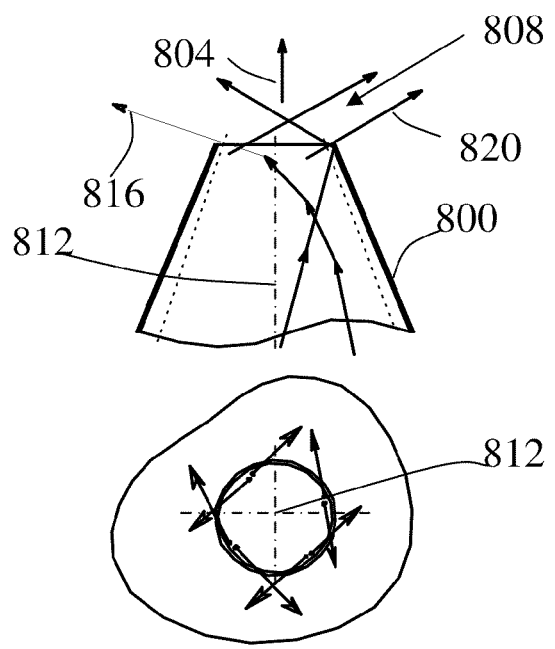
FIG. 8 is a schematic illustration of light beams leaving a double-cone illumination transforming and mixing element.

FIG. 8 is a schematic illustration of light beams leaving a double-cone luminous flux transforming and mixing element. It shows that some of the luminous flux, represented by arrows or beams (for example beam 804), are exiting the illumination outlet 808 of the double cone luminous flux transforming and mixing element 800 parallel to the double cone axis 812. Some of the beams, such as 816 and 820, are leaving at different angles that may be about 180 degrees between them. FIG. 8 practically illustrates that the reflecting conical surfaces of the double-cone element 900 are organized to provide an illumination distribution angle of 180 degrees at the illumination outlet or output surface 808 and because of this variety of distribution angles the illumination is uniformly distributed on the illumination output surface.

Figure 9:
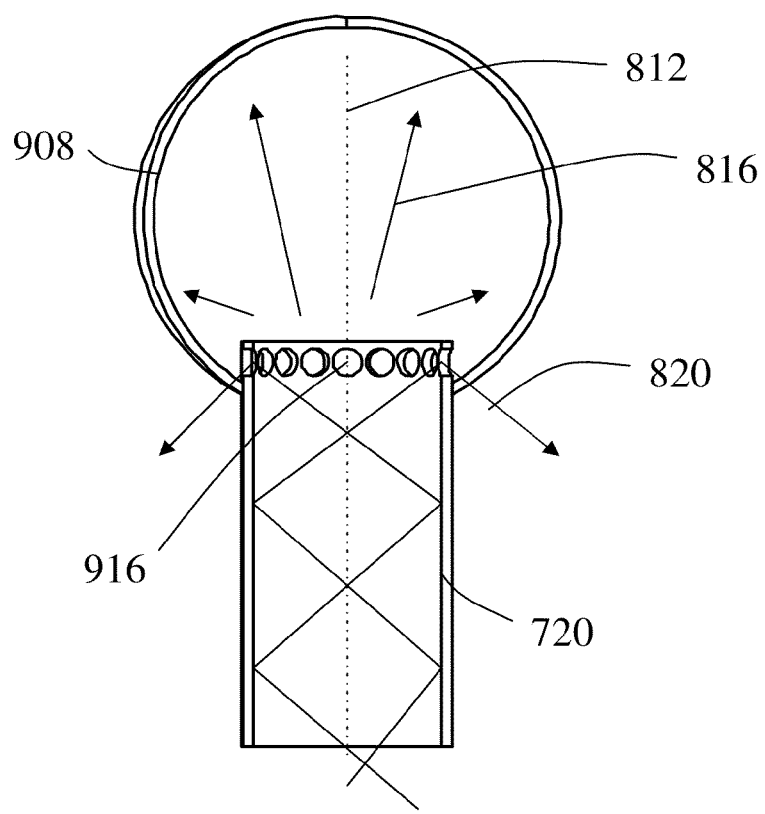
FIG. 9 is a schematic illustration of a light guide with additional illumination reflecting elements.

FIG. 9 is a schematic illustration of a light guide similar to light guide 720 with additional illumination reflecting elements. Beams 804, 816, and 820 (FIG. 8) leave the double-cone concentrator 800 through its illumination outlet 808 do not converge, but rather diverge. In order to create a more uniform light flux distribution, several rows of holes 916 into which reflecting surfaces may be inserted (The reflecting surfaces may be made by other methods also.). The reflecting surfaces may cause the illumination to undergo multiple reflections changing illumination beams direction and causing an almost uniform illumination distribution at the transparent radiator 908.

Figure 10:
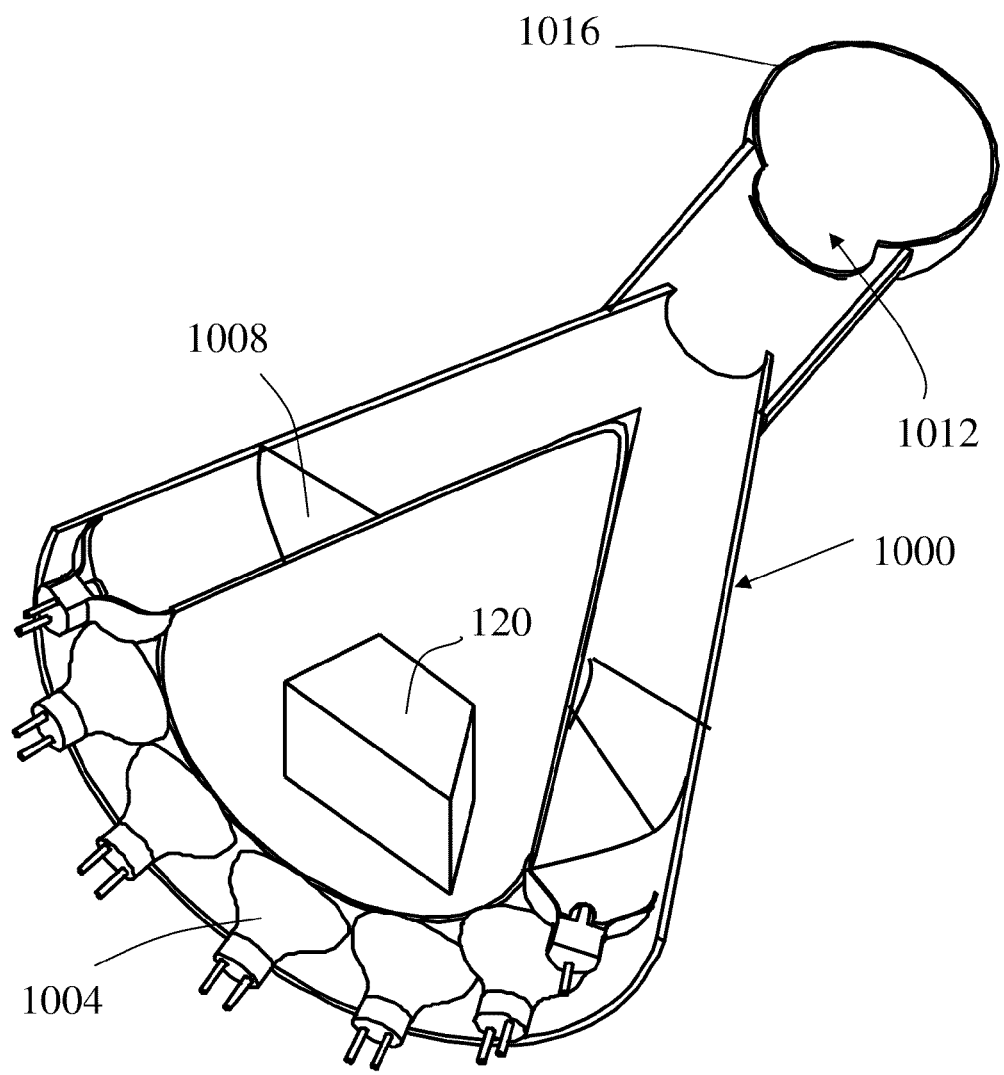
FIG. 10 is a schematic illustration of a relative arrangement of light sources and colour filters in a sixth exemplary embodiment of the apparatus.

FIG. 10 is a schematic illustration of a relative arrangement of light sources and colour filters in a sixth exemplary embodiment of the apparatus. A plurality of illumination sources 1004 may be mounted in a double-cone concentrator 1000. The sources may produce coloured light or be white light sources. If the sources 1004 are white light sources they may be provided with individual colour filters (not shown). Alternatively, a common ring-shaped triple-colour or multiple-colour filter 1008 may be installed at a distance from the light sources in a double-cone luminous flux transforming and mixing element 1000. Various intensity and hues of colour can be obtained at the illumination outlet opening 1012 that may be just an opening or may be an opening terminated by a transparent light radiator 1016 by controlling the luminous flux of such light sources. A local 120 or remote controller may control the intensity, colour, sequence of operation, and other parameters of the apparatus.

Figure 11:
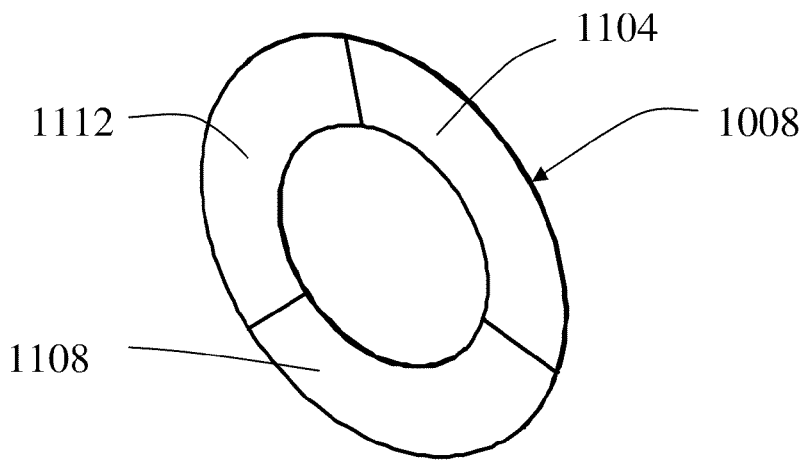
FIG. 11 is an exemplary embodiment of colour filter of FIG. 10.

FIG. 11 is an exemplary embodiment of the colour filter of FIG. 10. The filter 1008 includes at least three sections 1104, 1108, and 1112 enabling the illumination of a variety of colours. In some embodiments the filter may include more than three colour sections enabling a greater variety and smoothness of colours at the illumination outlet opening of 1012 (FIG. 10).

Figure 12:
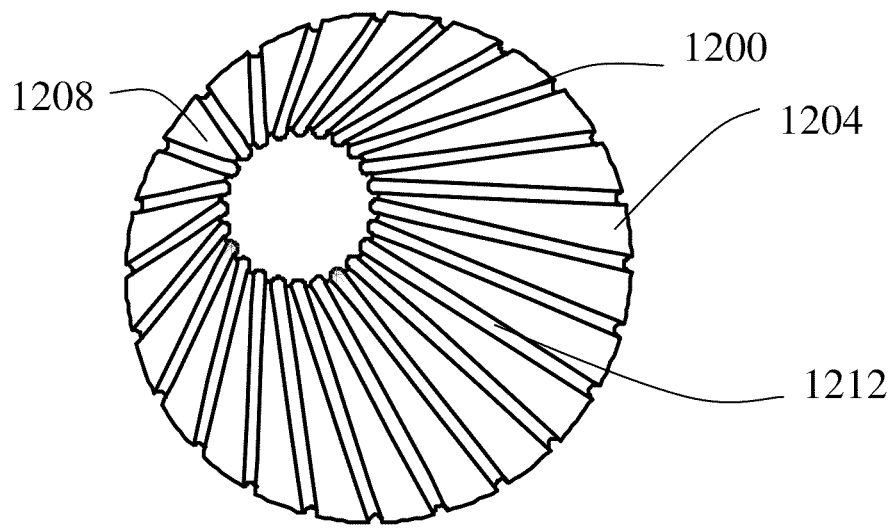
FIG. 12 is a schematic illustration of an exemplary surface of conical reflectors forming the double cone illumination transforming and mixing element.

FIG. 12 is a schematic illustration of an exemplary surface of conical reflectors forming a double cone luminous flux transforming and mixing element. The reflecting conical surfaces may be one of a group of surfaces consisting of linear surfaces produced by rotation of a straight line and curved surfaces produced by rotation of a curve. The reflecting conical surfaces 1204 of the luminous flux transforming element 1200 may include strips 1208 selectively reflecting the different wavelengths of the illumination. Surfaces 1204 of the luminous flux transforming element 1200 may also include slots or indentations 1212 selectively or uniformly dispersing different wavelengths of the illumination flux and further contributing to the homogeneous illumination distribution at the output opening of the double cone concentrator.

Figure 13:
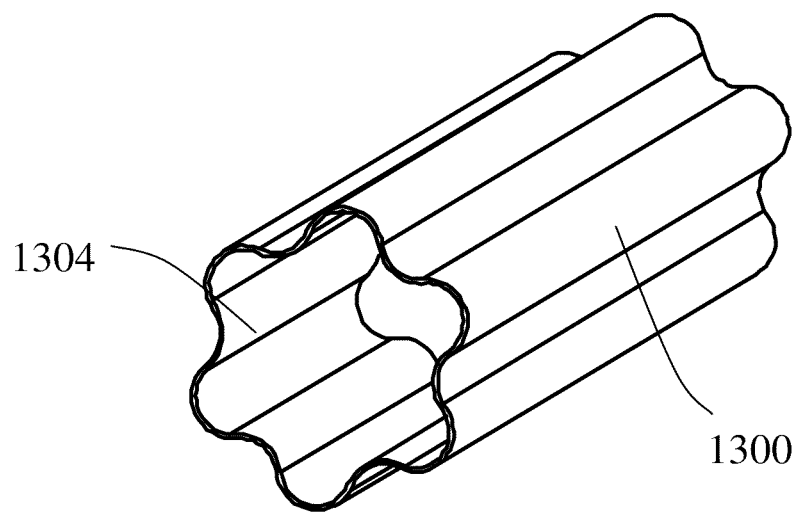
FIG. 13 is a schematic illustration of an additional embodiment of the colour mixing light guide.

FIG. 13 is a schematic illustration of an additional embodiment of the colour mixing light guide. Guide 1300 includes a shaped inner reflecting surface 1304. Guide 1300 may be used instead of light guide 720 (FIG. 7) for mixing colour and homogenizing illumination emitted by different light sources.

Figure 14:
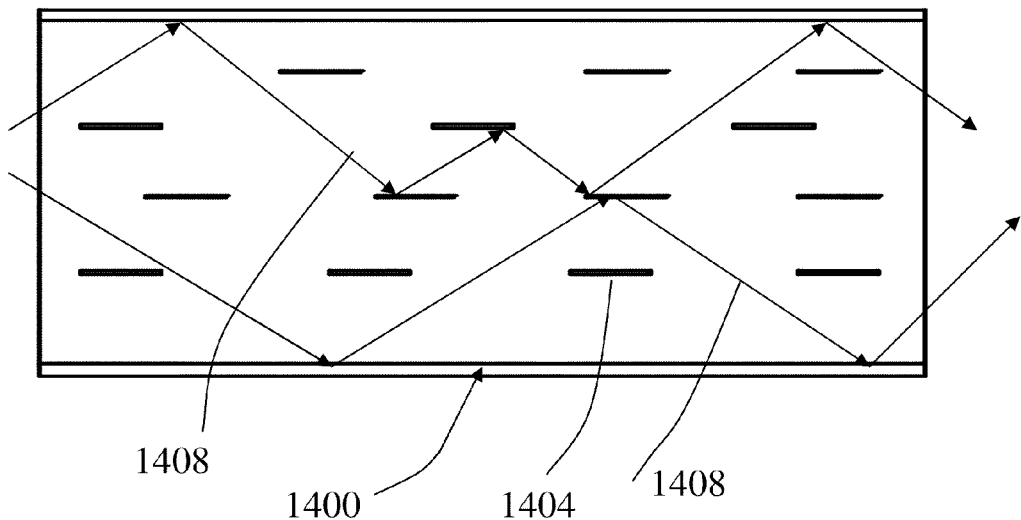
FIG. 14 is a schematic illustration of a further exemplary embodiment of a colour mixing light guide.

FIG. 14 is a schematic illustration of a further exemplary embodiment of a colour mixing light guide. Guide 1400 includes one or more inner minor elements 1404 acting to produce additional reflection(s) of illumination beam(s) 1408 enhancing the colour mixing and homogenizing of illumination emitted by different light sources. Guide 1400 may be used instead of light guide 720 (FIG. 7).

Figure 15:
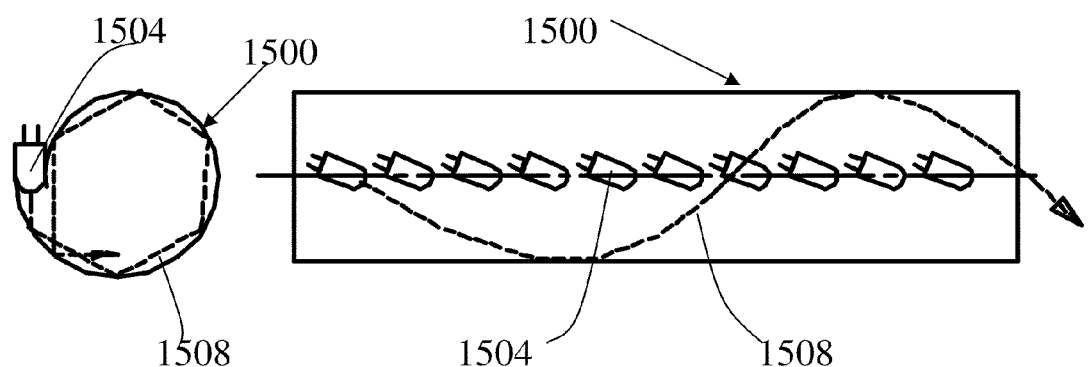
FIG. 15 is a schematic illustration of an exemplary embodiment of a hollow colour mixing and luminous flux concentrating light guide and a cross section of the guide.

FIG. 15 is a schematic illustration of an exemplary embodiment of a cylindrically shaped hollow colour mixing and illumination concentrating light guide and a cross section of the guide. The hollow colour mixing and luminous flux concentrating light guide 1500 supports creation of a luminous flux of variable colour. Light sources, e.g., LEDs 1504, may be arranged in a row along the light guide 1500 (the light sources 1504 are located on a spiral/helical line) and inclined such that the light beams emitted by each light source 1504 would be directed in the same direction. In this case, a light flux 1508 of practically any power can be coupled to the guide without a loss of luminous flux power. Moreover, the number of light sources, and correspondingly the power of the light flux coupled into the light guide, will only depend on the light guide length.

The illumination or light beams 1508 emitted by light sources 1504 are directed at an angle to the axis of the light guide 1500 and reflect from its inside wall following a helical or spiral line 1508. Accordingly, the colour mixing light guide can not only transmit light flux and mix different colours, but it also can simultaneously sum up the luminous energy. A high intensity light source may be created in this way.

Figure 16:
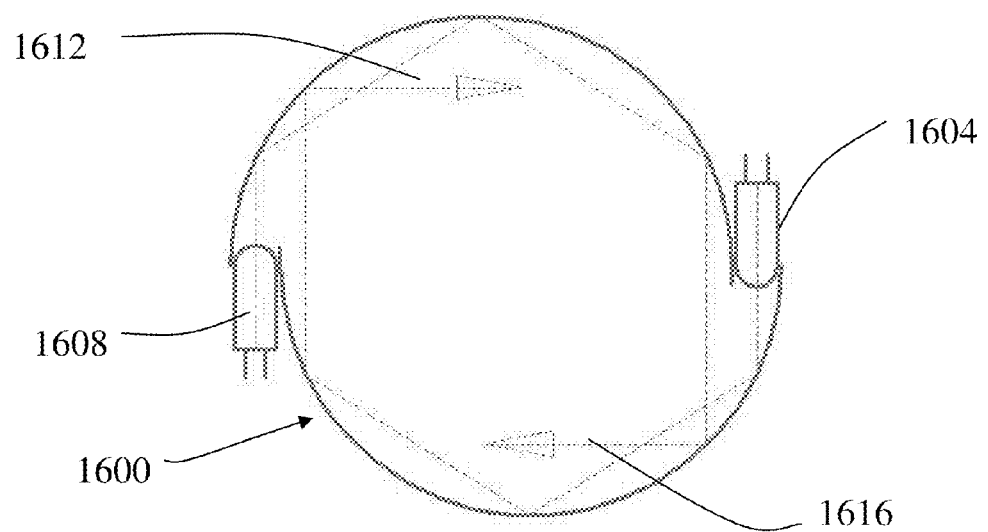
FIG. 16 is a schematic cross section of another exemplary embodiment of a colour mixing and luminous flux concentrating light guide showing a multiple reflection path of light beam emitted by the light sources.

FIG. 16 is a schematic illustration of a cross section of another exemplary embodiment of the colour mixing and luminous flux concentrating light guide showing a multiple reflection path of light beam emitted by the light sources. The spiral shaped hollow colour mixing and luminous flux concentrating light guide 1600 supports the creation of a luminous flux of variable colour by a plurality of light sources, e.g., LEDs 1604 and 1608 arranged in rows along the light guide 1600 on opposite sides of the guide and inclined such that the light beams emitted by each light source 1604 and 1608 would be directed in the same direction. In this case, light fluxes 1612 and 1616 would sum-up a powerful flux may be obtained by coupling the same amount of LEDs 1604 and 1608 to a light guide shorter than light guide 1500 (FIG. 15). Alternatively, a larger number of light sources may be coupled to a longer light guide.

Figure 17:
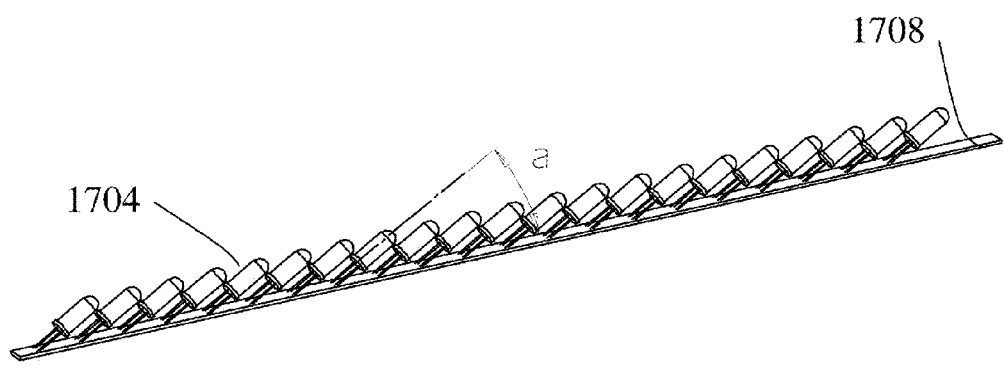
FIG. 17 is a schematic illustration of an exemplary plurality of LED light sources inclined to their mounting base in a straight-line assembly.

FIG. 17 is a schematic illustration of an exemplary straight-line assembly of LED light sources inclined to their mounting base on an angle alpha. LEDs 1704 are arranged on a linear strip 1708. LEDs 1704 may emit similar or different colour/wavelength illumination.

Figure 18:
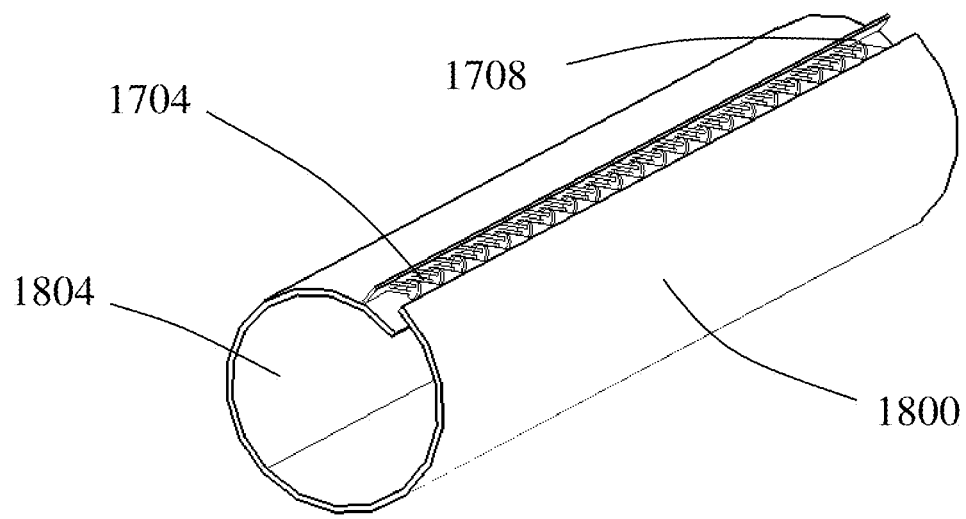
FIG. 18 is a schematic illustration of the arrangement of the plurality of LEDs from FIG. 17 in a colour mixing and luminous flux concentrating light guide.

FIG. 18 is a schematic illustration of the arrangement of LEDs of FIG. 17 in a colour mixing and luminous flux concentrating light element. Guide 1800 may be a hollow tube formed from sheet material and having a reflective inner surface 1804.

Figure 19:
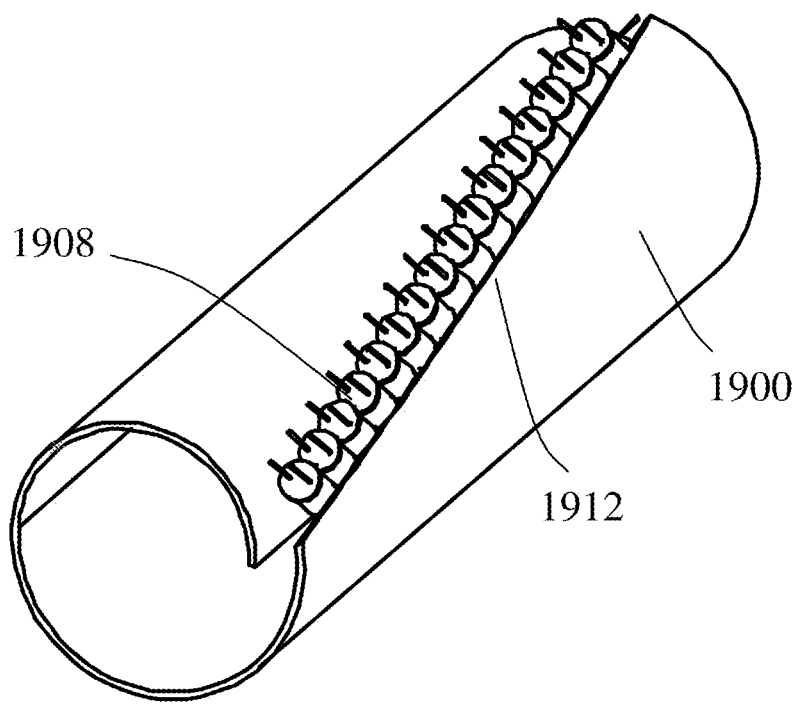
FIG. 19 is a schematic illustration of an exemplary arrangement of LEDs along a spiral line in the colour mixing and luminous flux concentrating light guide.

FIG. 19 is a schematic illustration of an exemplary arrangement of LEDs along a spiral line in the colour mixing and luminous flux concentrating light guide. Multiple LEDs or other illumination sources 1908 are arranged along a spiral line 1912 extending along the skin of a hollow cylindrical colour mixing and luminous flux concentrating light guide 1900. Guide 1900 may be a hollow tube formed from sheet material and having a reflective inner surface. Such an arrangement of illumination sources 1908 makes it possible to collect an illumination flux emitted by a plurality of identical light sources or to provide a flux of variable colour. In some embodiments there may be a number of rows 1912 with each row populated by a plurality of light sources. The length of guide 1900 may be used to vary the emitted illumination flux power.

Figure 20:
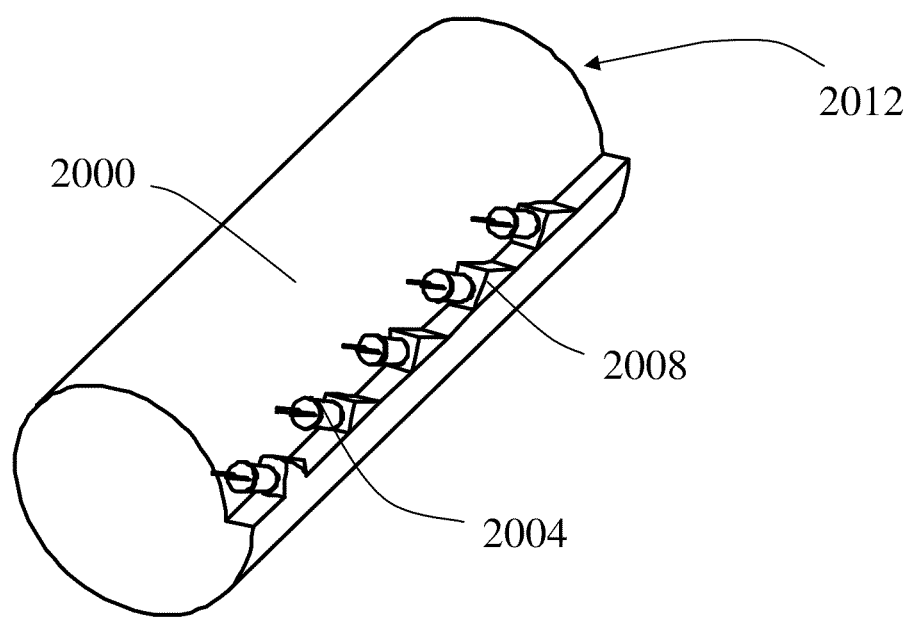
FIG. 20 is a schematic illustration of an exemplary embodiment of the colour mixing and luminous flux concentrating light guide made of a transparent material.

FIG. 20 is a schematic illustration of an exemplary embodiment of the colour mixing and luminous flux concentrating light guide made of a transparent material. Use of solid transparent material for the formation of guide 2000 enables the making of different lens type surfaces or terminations of the guide. For example, each of the LEDs 2004 may be placed in a mount 2008 terminated by a lens-shaped or flat termination facilitating better luminous flux concentration and colour mixing emitted by the LEDs 2004. In a similar manner the illumination output opening or end 2012 of guide 2000 may have a flat or lens-shaped termination eliminating the need in an additional illumination radiator similar to radiator 1016 (FIG. 10).

Figure 21:
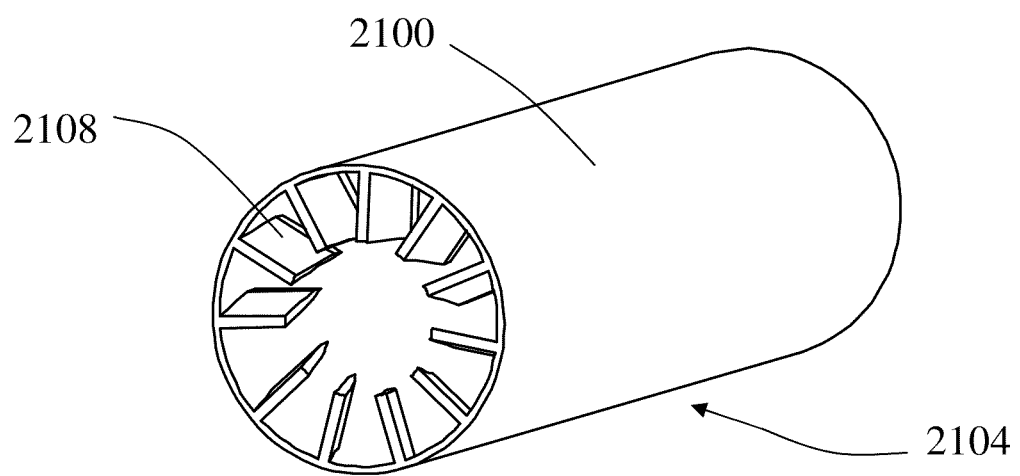
FIG. 21 is a schematic illustration of an exemplary embodiment of a colour mixing and a luminous flux concentrating light guide with inner protrusions directing the light along the light guide axis.

FIG. 21 is a schematic illustration of an exemplary embodiment of a colour mixing and luminous flux concentrating light guide with inner protrusions directing the light along the light guide axis. The light beams (not shown) reflected from the inner wall of colour mixing and energy concentrating light guide 2100 follow a helical line and may produce a non-uniform light flux distribution at the illumination output opening 2104 of guide 2100. For example, the luminous flux intensity may be lower in the centre of the illumination output opening than at the edges of the opening. To equalize the illumination intensity across the illumination output opening 2104, either special lenses or reflecting mirror elements or ribs 2108 are mounted at the outlet opening of the colour mixing and luminous flux concentrating light guide directing the 1.

Figure 22:
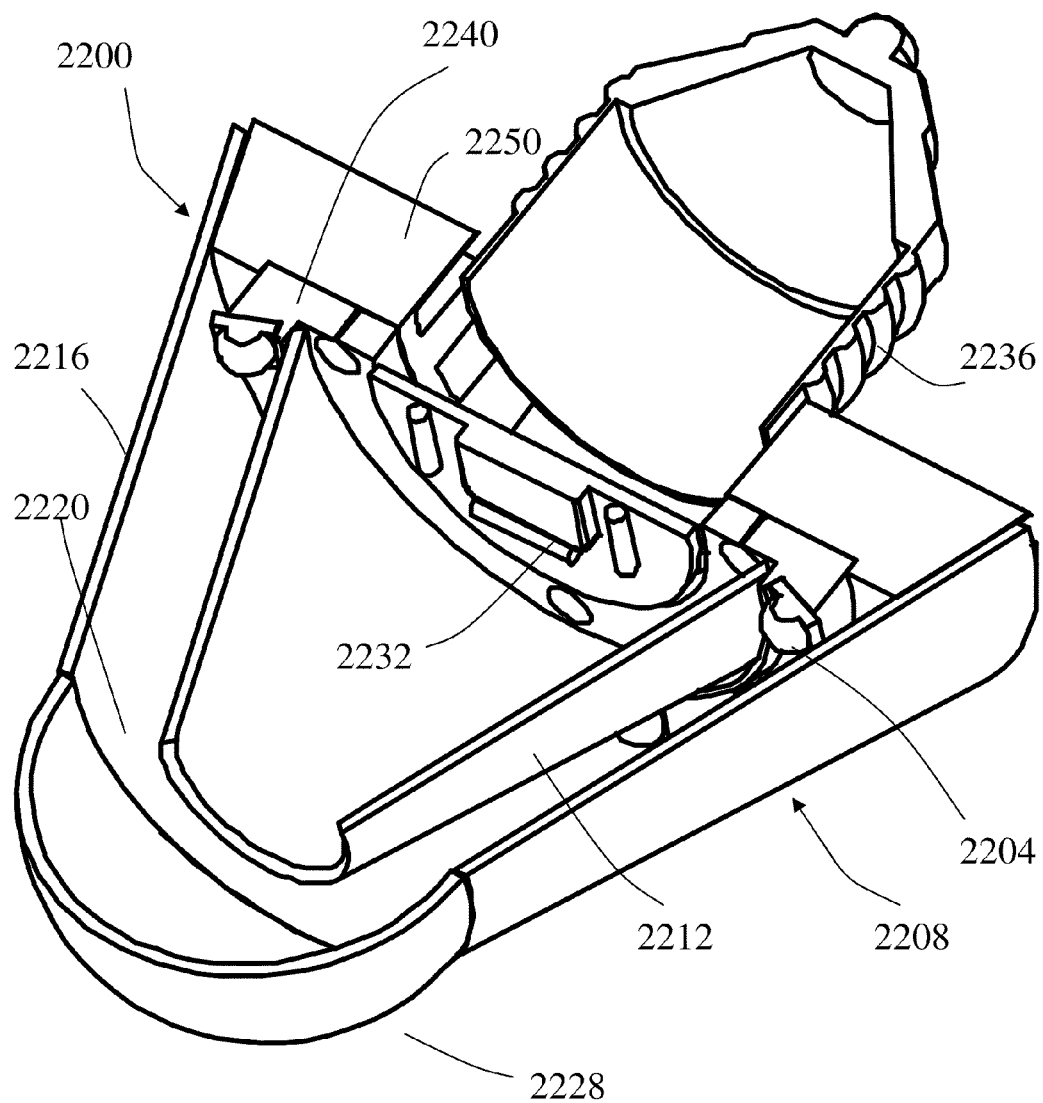
FIG. 22 is a schematic illustration of the seventh exemplary embodiment of the present lighting apparatus.

FIG. 22 is a schematic illustration of the seventh exemplary embodiment of the present lighting apparatus. Apparatus 2200 includes one or more light sources 2204 operating to illuminate at least one surface of a common illumination flux transforming and colour mixing element or double cone concentrator 2208 consisting of an inner cone 2212 and outer cone 2216. Concentrator 2208 is operative to transform the light provided by the illumination sources 2204 into a spot filling the illumination output surface 2220. A transparent or diffusing light radiator 2228 terminates the illumination output surface 2220 and the double cone concentrator 2208. A controller 2232 similar to controller 120 controls the operation of light sources 2204 that may be LEDs, laser diodes or other types of illumination or light sources. Controller 2232 may control the intensity, colour, sequence of operation, and other parameters of the illumination sources producing various intensities and hues of colour obtained at the illumination outlet opening 2220 that may be just an opening or may be terminated by a transparent light radiator 2228. Apparatus 2200 may include a threaded plug 2236 to be inserted into a standard lamp socket. Numerals 2240 and 2250 mark heat sinks that may be passive heat sinks of thermoelectric coolers. Other known and standard types of plugs compatible with the existing standards may be implemented.

Figure 23:
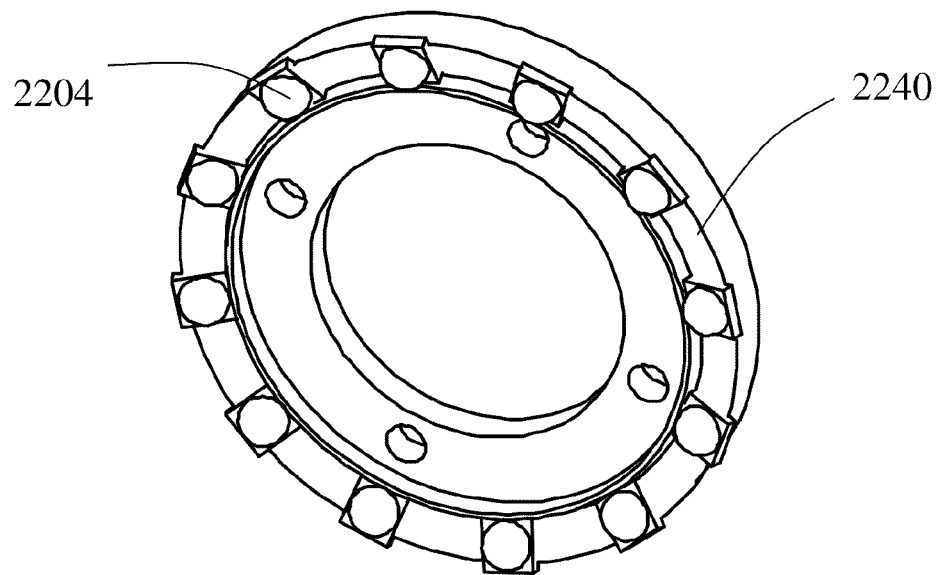
FIG. 23 is a detail of lighting apparatus of FIG. 22 illustrating the organization of the illumination sources.

FIG. 23 is a detail of the lighting apparatus of FIG. 22 illustrating the organization of illumination sources. Illumination sources and in particular incandescent lamps, LEDs, laser diodes and others dissipate large quantities of heat in the course of their operation. Advantageously, illumination sources 2204 may be mounted on a ring type mount 2240 made of a material which is a good heat conductor. Such a mount may become a heat sink effectively evacuating and dissipating the heat generated by the illumination sources 2504. Heat sink 2240's heat dissipation capabilities may be further enhanced by providing it with heat dissipating ribs (not shown).

Figure 24:
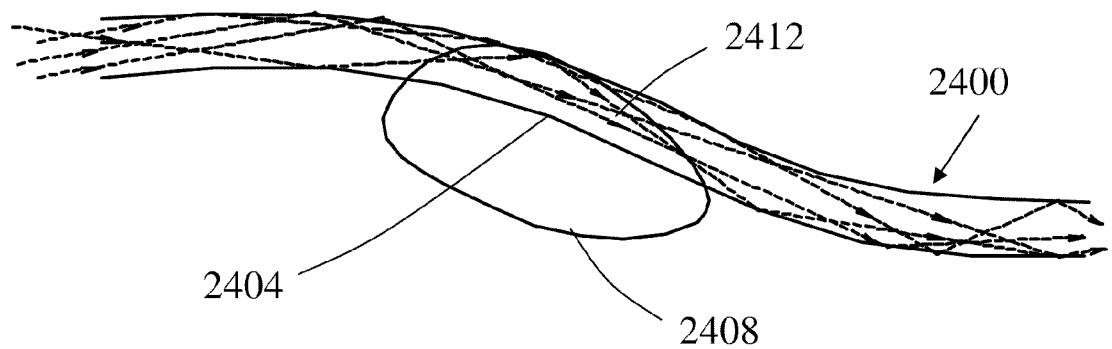
FIG. 24 is a schematic illustration of illumination propagation in a curved light guide such as an optical fibre.

FIG. 24 is a schematic illustration of light propagation in a curved light guide such as an optical fibre. The colour mixing and luminous flux concentrating light guide may also be a curvilinear guide 2400. As it is shown in FIG. 24, the luminous flux 2412 propagating in a curvilinear guide 2400 forms at the curved or bended sections 2404 of the guide's "dark pockets" 2408. These are zones where because of their curvature no light beams propagate.

Figure 25:
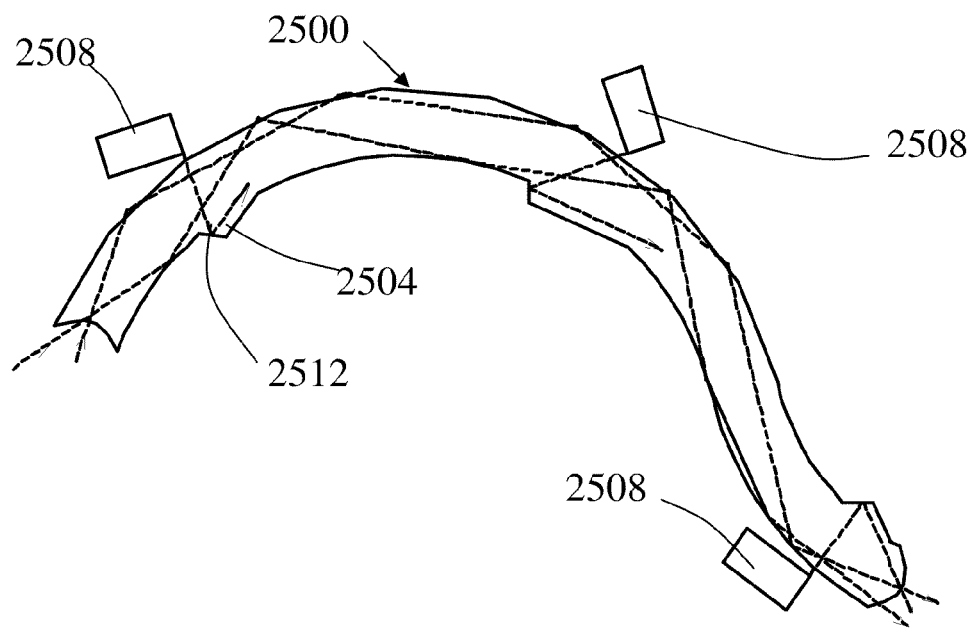
FIG. 25 is a schematic illustration of an exemplary embodiment of a light guide with a plurality of laser diodes located in the concave sections of the bended light guide and operating to introduce additional illumination into the light guide.

FIG. 25 is a schematic illustration of an exemplary embodiment of a light guide with a plurality of light sources located in the concave sections of the light guide and operating to introduce additional luminous flux into the light guide 2500. It illustrates a curvilinear guide 2500 that may be a flexible light guide, e.g., a fibre. At bends of the transparent light guide, for example, at the concave bend sections 2504 there may be conditions where the illumination beams do not meet the guide's 2500 inner surface boundary at the critical angle and as such, some of the illumination is not reflected back into the light guide. These concave bend sections may be provided with protrusions 2504 having mirrored surface and illumination emitting elements 2508 organized such that the illumination flux emitted by them could be added to the flux emitted by the illumination elements already coupled to the same light guide. Such illumination elements may be laser diodes, LEDs or other illumination sources.

Figure 26:
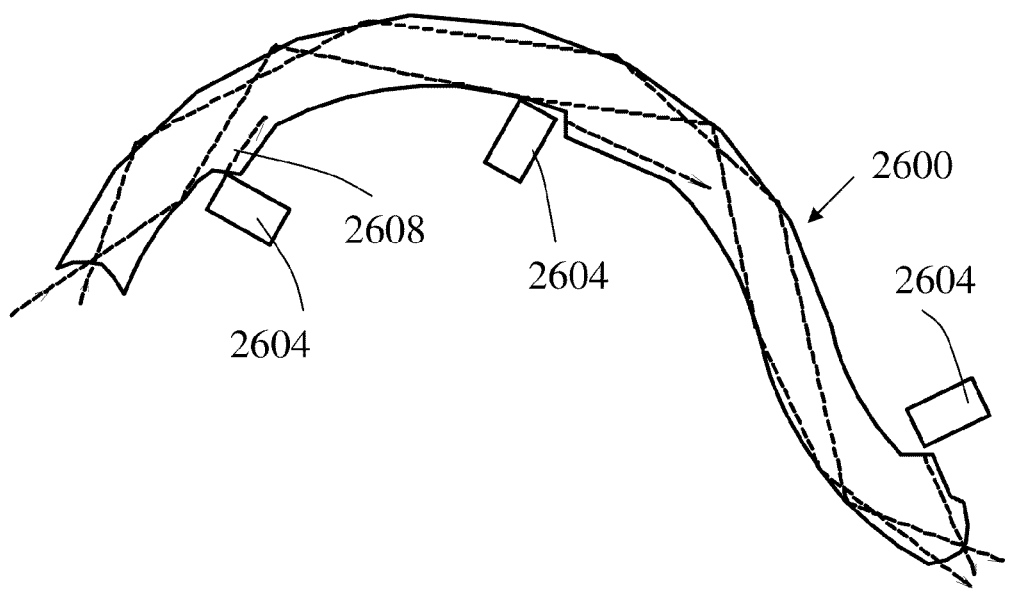
FIG. 26 is a schematic illustration of an exemplary embodiment of a light guide with a plurality of laser diodes located in the convex sections of the bended light guide and operating to introduce additional illumination into the light guide.

FIG. 26 is a schematic illustration of an exemplary embodiment of a light guide with a plurality of light sources located in the convex sections of the light guide and operating to introduce additional luminous flux into the light guide. The FIG illustrates a curvilinear light guide 2600 similar to FIG. 25 where additional light sources 2604 emitting light 2608 are coupled at the convex sections of the light guide.

Figure 27:
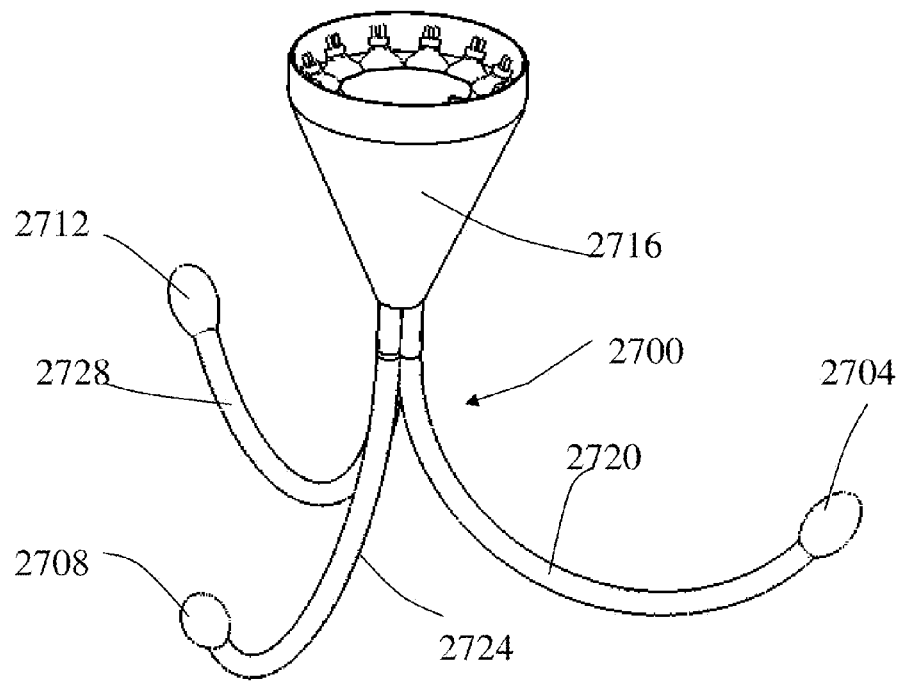
FIG. 27 is a schematic illustration of an exemplary embodiment of a chandelier including a single double-cone light concentrator terminated by three luminous flux emitting terminations of different colour with their colour governed by an independent control.

FIG. 27 is a schematic illustration of an exemplary embodiment of a chandelier including a single double-cone luminous flux concentrator terminated by three illumination emitting terminations of different colour. Chandelier 2700 is constructed and operating to illuminate a room. The chandelier may operate in an automatic or manual mode with the operation governed by an earlier disclosed controller 120 providing comfortable lighting. Chandelier 2700 may be connected to a controller governed for example, by music. Each of chandelier 2700's radiators 2704, 2708, and 2712 may have an independent control. The colour of each of the radiators may be varied continuously or in steps. The range of colours that may be achieved by such an arrangement is practically unlimited.

The colour may be set manually by turning a knob and visually controlling the colour and illumination intensity or automatically by a local or remote controller. In an additional embodiment each of chandelier 2700's radiators 2704, 2708, and 2712 may communicate with a double-cone concentrator 2716 through separate colour mixing and luminous flux concentrating light guides 2720, 2724, and 2728.

Figure 28:
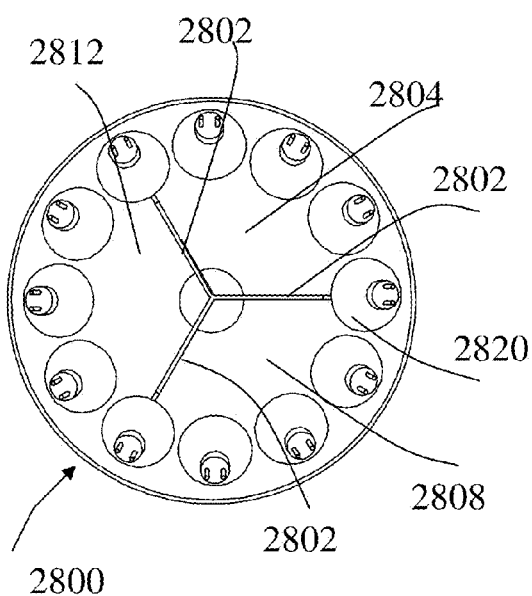
FIG. 28 is a schematic illustration of an exemplary embodiment of a sectioned double cone luminous flux concentrator.

FIG. 28 is a schematic illustration of an exemplary embodiment of a sectioned double cone illumination concentrator. The inter-cone space of a double-cone concentrator 2800 may be divided by partitions 2802 into several sections, for example, into three sections 2804, 2808, and 2812. Flux emitted by each of the sections may be directed into an additional common or separate colour mixing and luminous flux concentrating light guide (not shown). Numeral 2820 marks illumination sources that may be any one of the listed above illumination sources.

Figure 29:
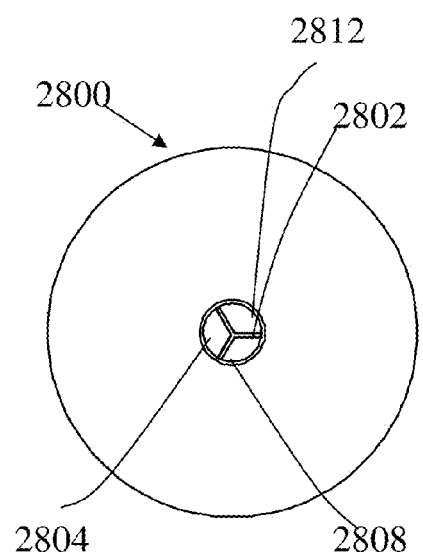
FIG. 29 is a schematic illustration of an exemplary embodiment of a sectioned output opening of a double cone concentrator including three separate luminous flux output sections.

FIG. 29 is a schematic illustration of an exemplary embodiment of a sectioned output opening of a double cone concentrator including three separate illumination flux output sections. (Partitions 2802 extend along the cone and divide the output opening 2904 into three sections being extensions of sections 2804, 2808, and 2812. Each of the sections may have an independent drive. Such a cone structure enables the delivering of the illumination flux from each section separately into appropriate colour mixing light guides (not shown) similar to guides 2720, 2724, and 2728 of chandelier 2700 (FIG. 27).

Figures 30, 31:
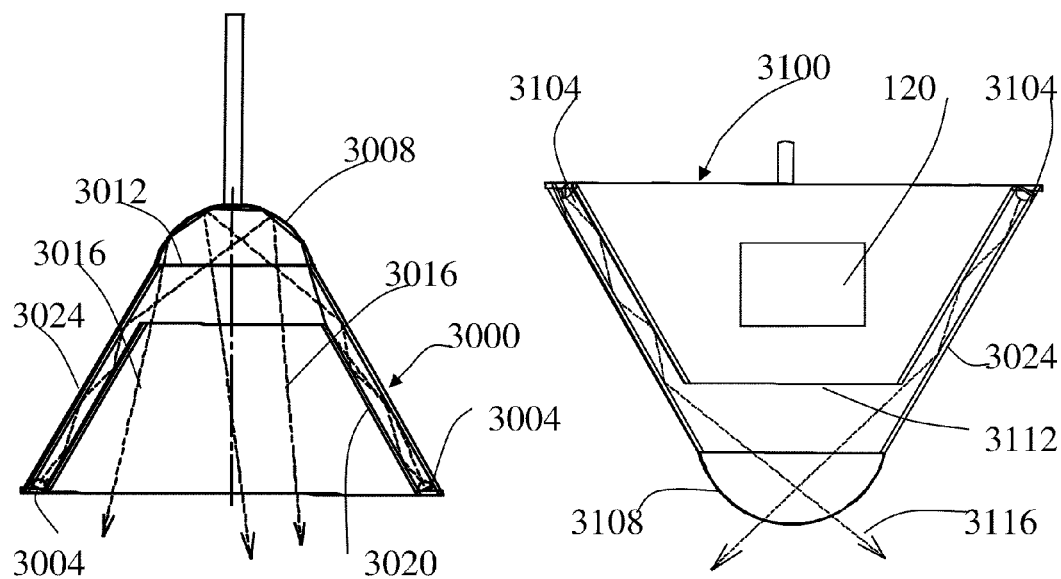
FIG. 30 is a schematic illustration of an exemplary embodiment of a ceiling luminary with a double cone concentrator.
FIG. 31 is a schematic illustration of another exemplary embodiment of a ceiling luminary with a double cone concentrator.

FIG. 30 is a schematic illustration of an exemplary embodiment of a ceiling luminary with a double cone concentrator. The double cone concentrator 3000 concentrates and mixes illumination emitted by a plurality of illumination sources 3004 that may be sources of any discussed earlier type. A mirror reflector 3008 terminates output opening 3012 of double cone concentrator 3000. Reflector 3008 may be configured to focus illumination emitted through output opening 3012 and shown by arrowed lines 3016 into a spot or into a diverging illumination beam to illuminate relatively large area. Surface 3020 of the inner cone may be made to reflect the illumination or diffuse the illumination. External surface 3024 of the external cone may be decorated surface. A controller (not shown) similar to controller 120 may control operation of the ceiling luminary. The controller may change the colour of individual illumination sources 3004 according to a predetermined order or enable a manual colour change.

FIG. 31 is a schematic illustration of another exemplary embodiment of a ceiling luminary with a double cone concentrator. Concentrator 3100 includes a plurality of illumination sources 3104 that may be sources of any discussed earlier type, mounted between the external and internal cones. An illumination diffusing or transparent cup 3108 terminates output opening 3112 of double cone concentrator 3100. Cup 3108 may be configured to focus illumination emitted through output opening 3112 and shown by arrowed lines 3116 into a spot or into a diverging illumination beam to illuminate a relatively large area. External surface 3024 of the external cone may be a decorated surface. A controller 120 may control the operation of the ceiling luminary.

Figure 32:
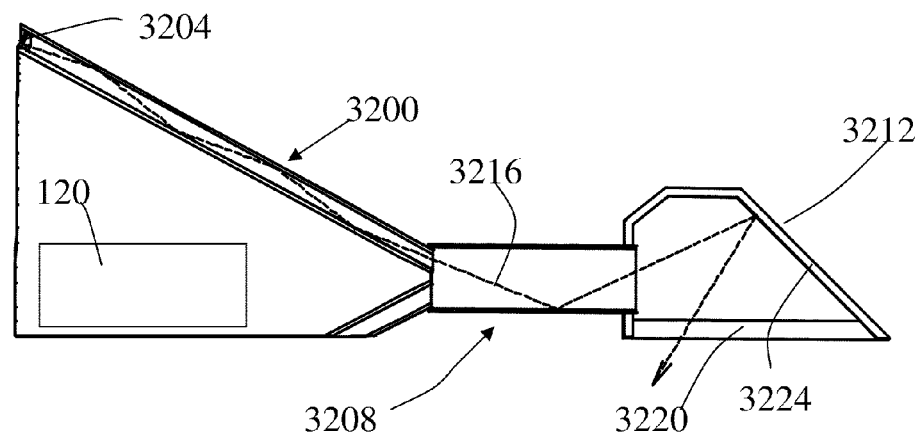
FIG. 32 is a schematic illustration of an exemplary embodiment of a wall bracket luminary with a double cone concentrator.

FIG. 32 is a schematic illustration of an exemplary embodiment of a wall bracket luminary with a double cone concentrator. The illumination flux emitted by illumination sources 3204, shown schematically by arrowed lines 3216, emerging from the double-cone concentrator 3200 is coupled to a light guide 3208 terminated by a light reflector 3212. The inner surface 3224 of reflector 3212 may be a light reflecting or light diffusing surface. Various intensities and hues of colour can be obtained at the light illumination outlet opening 3220 of the light guide.

Figure 33:
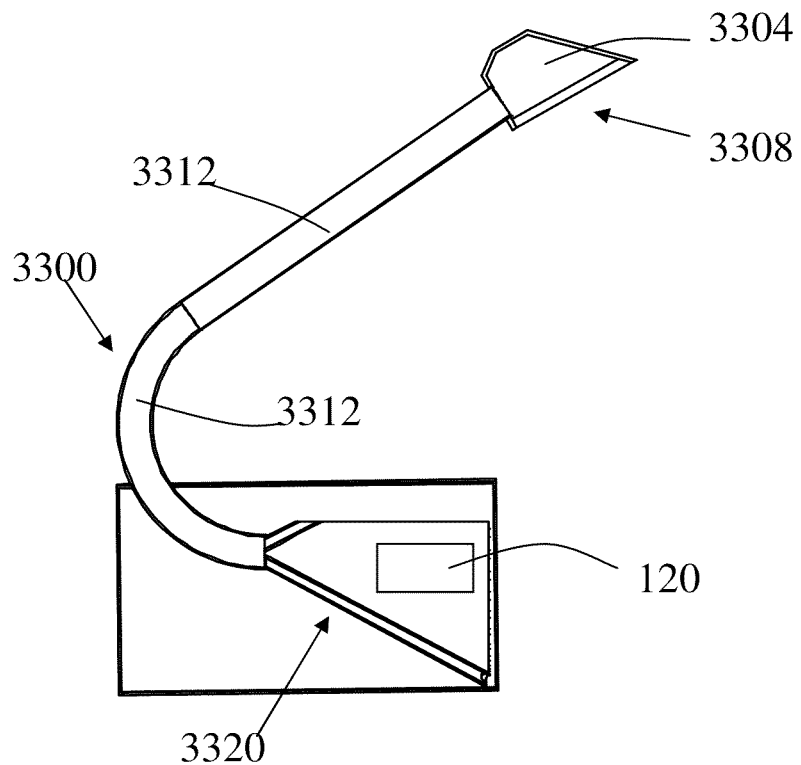
FIG. 33 is a schematic illustration of an exemplary embodiment of a desk-top luminary with a double cone concentrator and a light guide.

FIG. 33 is a schematic illustration of an exemplary embodiment of a desk-top luminary with a double cone concentrator 3320 and a light guide 3312. Luminary 3300 operates similar to the wall bracket luminary 3200. Reflector 3304 may have an illumination reflecting or illumination dispersing inner surface 3308. Light guide 3312 may have straight and curved sections. Illumination sources (not shown) may be LEDs, incandescent lamps, laser diodes and other known sources.

Figure 34:
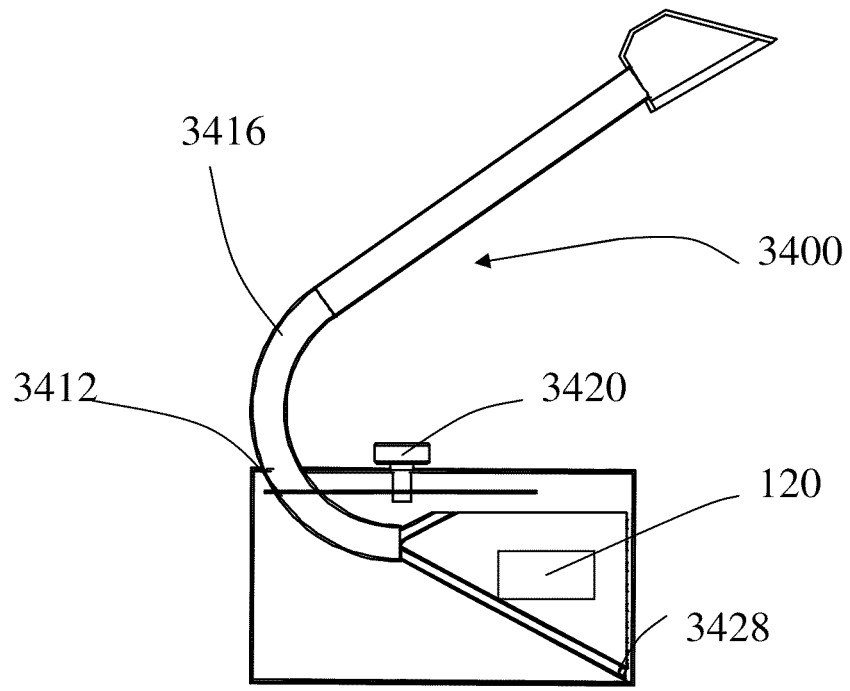
FIG. 34 is a schematic illustration of an exemplary embodiment of a desk luminary with a double cone concentrator, a light guide, and a rotating colour filter.

FIG. 34 is a schematic illustration of an exemplary embodiment of a desk lamp with a double cone concentrator and a rotating colour filter. A colour filter 3412 is inserted into light guide 3416. The colour of light of the lamp 3400 may be controlled by rotating filter 3412 with the help of knob 3420. Additionally, controller 120 or any similar controller may vary the brightness and power of each colour or non-colour illumination source 3428.

Figure 35:
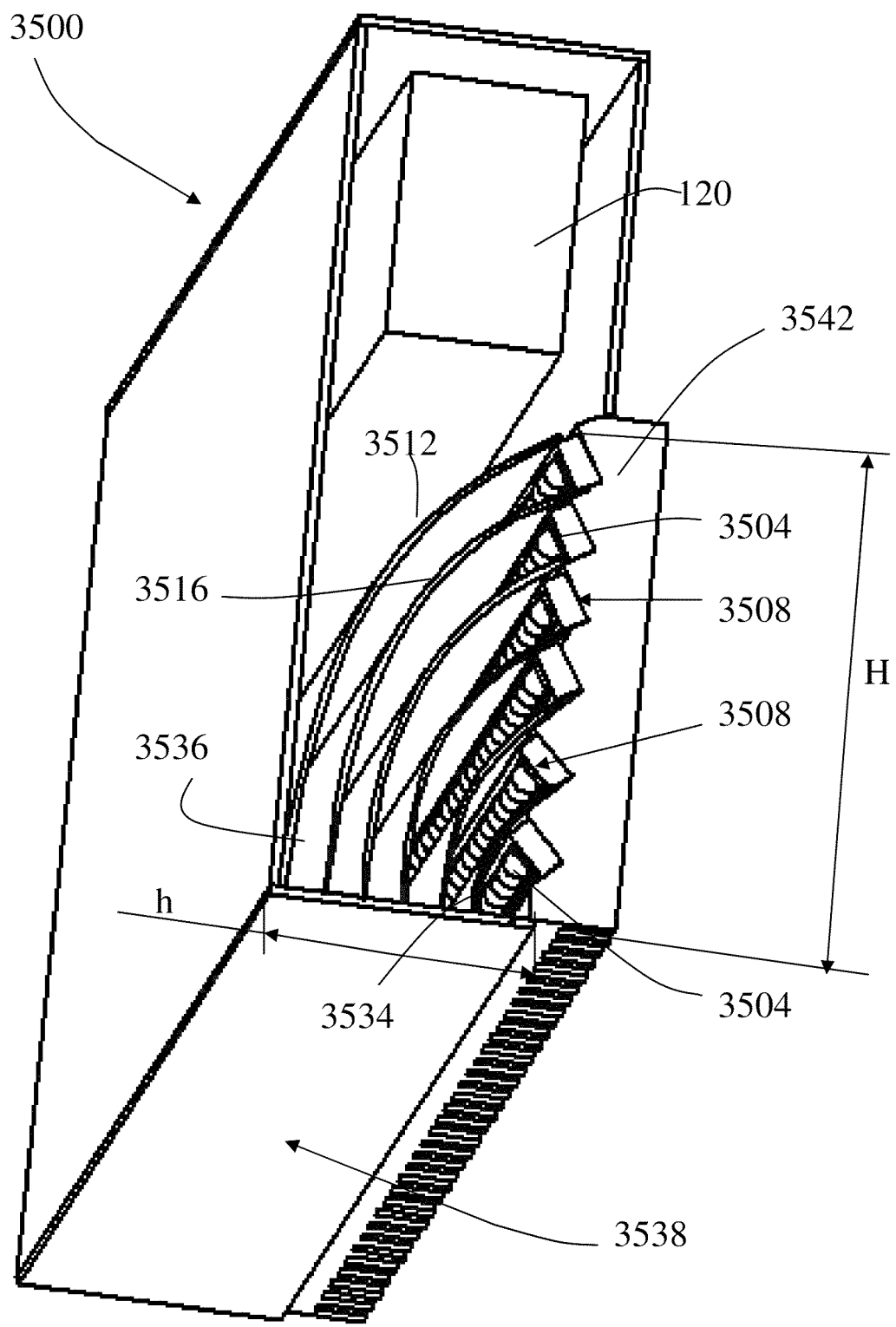
FIG. 35 is a schematic illustration of the eights exemplary embodiment of the present lighting apparatus.

FIG. 35 is a schematic illustration of the eighth exemplary embodiment of the present lighting apparatus. Apparatus 3500 includes a plurality of LEDs 3504 or laser diodes, or other light sources arranged in a linear array or a plurality of linear arrays 3508 that may be further combined to form a two dimensional illumination sources matrix. The arrays or matrices are located between two linearly extended curved surfaces, for example, surfaces 3512 and 3516 or any other pair of neighbour curved surfaces of a plurality of surfaces 3512 through 3534 included in apparatus 3500. A pair of neighbour linearly extended curved surfaces forms a luminous flux transforming and colour mixing element and the space 3536 between the neighbour surfaces forms an illumination conducting guide. All of the surfaces terminate at the same illumination output plane 3538, where the illumination emitted by the arrays forms a homogeneously illuminated output plane or surface. The linear dimensions of the output plane are practically unlimited and about equal to the length of arrays. The illumination flux reaching the output plane 3538 would generally be proportional to a ratio of surfaces/dimension marked H of the array or matrix to the surface/dimension h of the output plane. Since the reflecting surfaces 3512 through 3534 may converge at the output plane, they will concentrate a significant illumination flux emitted, for example, by a two dimensional matrix into a narrow line located in the output plane 3538. The LEDs or laser diodes may be mounted on a heat sink 3542 to maintain the operating temperature of the light sources.

Since the illumination flux is modified (reflected or directed) by reflective surfaces, illumination sources of different wavelengths may be combined into one array providing a mix of wavelengths at the output plane. Such sources may be UV or IR sources that may be used for curing or drying different coatings and printed ink. The sources may be visible illuminating surfaces of planar objects such as printed circuit boards, solar panels and other objects facilitating optical inspection.

While the exemplary embodiment of the method of and apparatus for accurate measurement and determination of optical and geometric parameters of thin films forming a stack have been illustrated and described, it will be appreciated that various changes can be made therein without affecting the spirit and scope of the method. The scope of the method, therefore, is defined by reference to the following claims:

What is claimed is:

1. A variable colour illumination apparatus, said apparatus comprising:
    an illumination output surface;
    one or more color illumination sources operating to illuminate at least one surface of a common luminous flux transforming and colour mixing element comprising an assembly of at least two coaxial rotational symmetry shapes, wherein the external surface of the internal rotational symmetry shape is a reflective surface and the internal surface of the external rotational symmetry shape is a reflective surface; and
    wherein the external surface of the internal rotational symmetry shape is facing the internal surface of the external rotational symmetry shape; and
    wherein the external surface of the internal rotational symmetry shape is separated from the internal surface of the external rotational symmetry shape so as to create a cavity through which light can propagate; and
    wherein the element is operative to transform the luminous flux provided by the illumination sources into a homogeneous illumination spot filling the illumination output surface.

2. The apparatus according to claim 1 wherein one or more illumination sources are at least one of a group consisting of laser diodes, light emitting diodes, an incandescent lamp and circular light sources.

3. The apparatus according to claim 2 further comprising illumination sources of different shape and size and operating at a plurality of wavelengths.

4. The apparatus according to claim 1 wherein the illumination output surface is one of a group consisting of flat and curved surfaces and wherein the surfaces may be of different colour.

5. The apparatus according to claim 1 wherein the reflecting coaxial surfaces are one of a group of surfaces consisting of surfaces produced by rotation of a straight line and surfaces produced by rotation of a curved line around an axis and wherein the surfaces form with the axis equal inclination angles or different inclination angles; and
    wherein at least a part of the inclination angles is different than zero degrees.

6. The apparatus according to claim 1 wherein the coaxial reflecting surfaces of the luminous flux transforming element are operative to selectively reflect different wavelengths of the luminous flux.

7. The apparatus according to claim 1 wherein the illumination sources are located at the perimeter of the base of a luminous flux transforming element between the coaxial reflecting surfaces of the luminous flux transforming element.

8. The apparatus according to claim 1 wherein the illumination sources' axes are oriented at an angle to the coaxial shapes axis and are organized to provide a light distribution angle of 180 degrees at the illumination output surface and the light is uniformly distributed on the illumination output surface.

9. The apparatus according to claim 1 wherein the variable colour illumination flux is a mix of fluxes produced by the colour illumination sources between the coaxial reflecting surface of the luminous flux transforming element.

10. The apparatus according to claim 9 wherein the reflecting surfaces producing a mix of colours are made to diffuse the illumination.

11. The apparatus according to claim 9 wherein at least one of the coaxial reflecting surfaces of the luminous flux transforming element includes slots facilitating light sources cooling.

12. A method of enhancing the illumination in an illuminated spot, said method being:
    providing a luminous flux transforming and colour mixing element comprising an assembly of at least two coaxial rotational symmetry shapes, wherein the external surface of the internal rotational symmetry shape is a reflective surface and the internal surface of the external rotational symmetry shape is a reflective surface; and
    the assembly having a first end and a second end; and
    mounting one or more illumination sources at one end of the element; and forming a homogenously illuminated spot at the second end of the luminous flux transforming and colour mixing element.

13. The method according to claim 12 wherein the illumination intensity at the second end of the luminous flux transforming and colour mixing element relates to the illumination flux emitted at the first end of the luminous flux transforming and colour mixing element as the surface of the first end to the surface of the second end.

* * * * *